United States Patent [19]
Galletti

[11] Patent Number: 5,118,420
[45] Date of Patent: Jun. 2, 1992

[54] SELF-CLEANING VACUUM FILTER, PARTICULARLY FOR FILTERING INDUSTRIAL LUBRICANTS AND COOLANTS

[75] Inventor: Alfonso Galletti, Turin, Italy
[73] Assignee: GI. PI. S.r.L., Turin, Italy
[21] Appl. No.: 656,373
[22] Filed: Feb. 19, 1991

[30] Foreign Application Priority Data
Oct. 26, 1990 [IT] Italy ............................... 67831 A/90

[51] Int. Cl.$^5$ ............................................ B01D 33/04
[52] U.S. Cl. ................................... 210/386; 210/393; 210/396; 210/401; 210/406; 210/408
[58] Field of Search ............... 210/391, 396, 400, 401, 210/406, 408, 413, 415, 386, 393

[56] References Cited
U.S. PATENT DOCUMENTS
2,471,517 5/1949 Chaffee ............................... 210/400
3,789,985 2/1974 Eakins ................................ 210/396

Primary Examiner—Ivars Cintins
Attorney, Agent, or Firm—Sughrue, Mion, Zinn, Macpeak & Seas

[57] ABSTRACT

A self-cleaning vacuum filter, particularly for filtering industrial lubricants and coolants, comprises a tank for the liquid to be filtered containing a filter assembly, the bottom of which communicates with a vacuum chamber connected to a suction device for the liquid. The filter assembly includes a screen and an endless loop of regenerable filter cloth movable in steps over the screen and through a station for the removal of the filtered material, the station extending out of the tank and having a removal device for removing the filtered material from the filter cloth. The removal device includes a roller extending transverse of the filter cloth, substantially in contact therewith, and a motor for rotating the roller at high speed.

7 Claims, 2 Drawing Sheets

SELF-CLEANING VACUUM FILTER, PARTICULARLY FOR FILTERING INDUSTRIAL LUBRICANTS AND COOLANTS

BACKGROUND OF THE INVENTION

The present invention relates in general to vacuum filters for filtering industrial lubricants and coolants.

More particularly, the invention is concerned with a self-cleaning vacuum filter of the type including a tank for the liquid to be filtered containing a filter assembly, the bottom of which communicates with a vacuum chamber connected to suction means for the liquid, the filter assembly including a screen and an endless loop of regenerable filter cloth having return rollers and movable in steps, by motor-driven entrainment means, over the screen and through a station for the removal of the filtered material, the station extending out of the tank and having means for removing the filtered material from the filter cloth.

Vacuum filters of this type are known, for example, from the present Applicant's European patent application No. 90830303.5.

With these filters, there is a problem in effectively removing the filtered material from the filter cloth so as to prevent it from becoming clogged and to ensure that its filtering characteristics remain constant, as required.

According to the prior art, systems for removing the filtered material from the filter cloth generally include devices for draining or drying the portion of the cloth which emerges from the tank and mechanical or fluid-dynamic removal devices located downstream thereof. For example, in the European patent application cited above, the dried filtered material is removed by a return roller over which the return pass of the filter cloth passes. In other embodiments, nozzles for supplying compressed air are used. In either case, it is not always possible to achieve effective removal and it is necessary to have auxiliary systems, such as devices for washing the belt in a counter-current, or even to replace the belt frequently.

SUMMARY OF THE INVENTION

The object of the present invention is to resolve the aforementioned problem simply, effectively and cheaply.

According to the invention, this object is achieved by virtue of the fact that the means for removing the filtered material from the filter cloth include a roller extending transversely the filter cloth, substantially in contact therewith, and motor-driven means for rotating the roller at high speed.

By virtue of this concept, the filtered material is removed effectively from the cloth by virtue of a fluid-dynamic vacuum effect, and hence a suction effect, created immediately downstream of the roller by the high-speed rotation of its cylindrical wall very close to the surface of the filter cloth.

The cylindrical wall of the roller may be smooth or, alternatively, may be grooved or knurled.

The roller conveniently rotates faster than 2500 revolutions per minute and its sense of rotation may or may not correspond to the direction of advance of the filter cloth.

A mechanical scraper or a compressed-air blower unit may be provided upstream of the roller for further improving removal.

BRIEF DESCRIPTION OF THE DRAWINGS

The invention will now be described in detail with reference to the appended drawings provided purely by way of non-limiting example, in which.

DETAILED DESCRIPTION OF THE INVENTION

Figure 1:
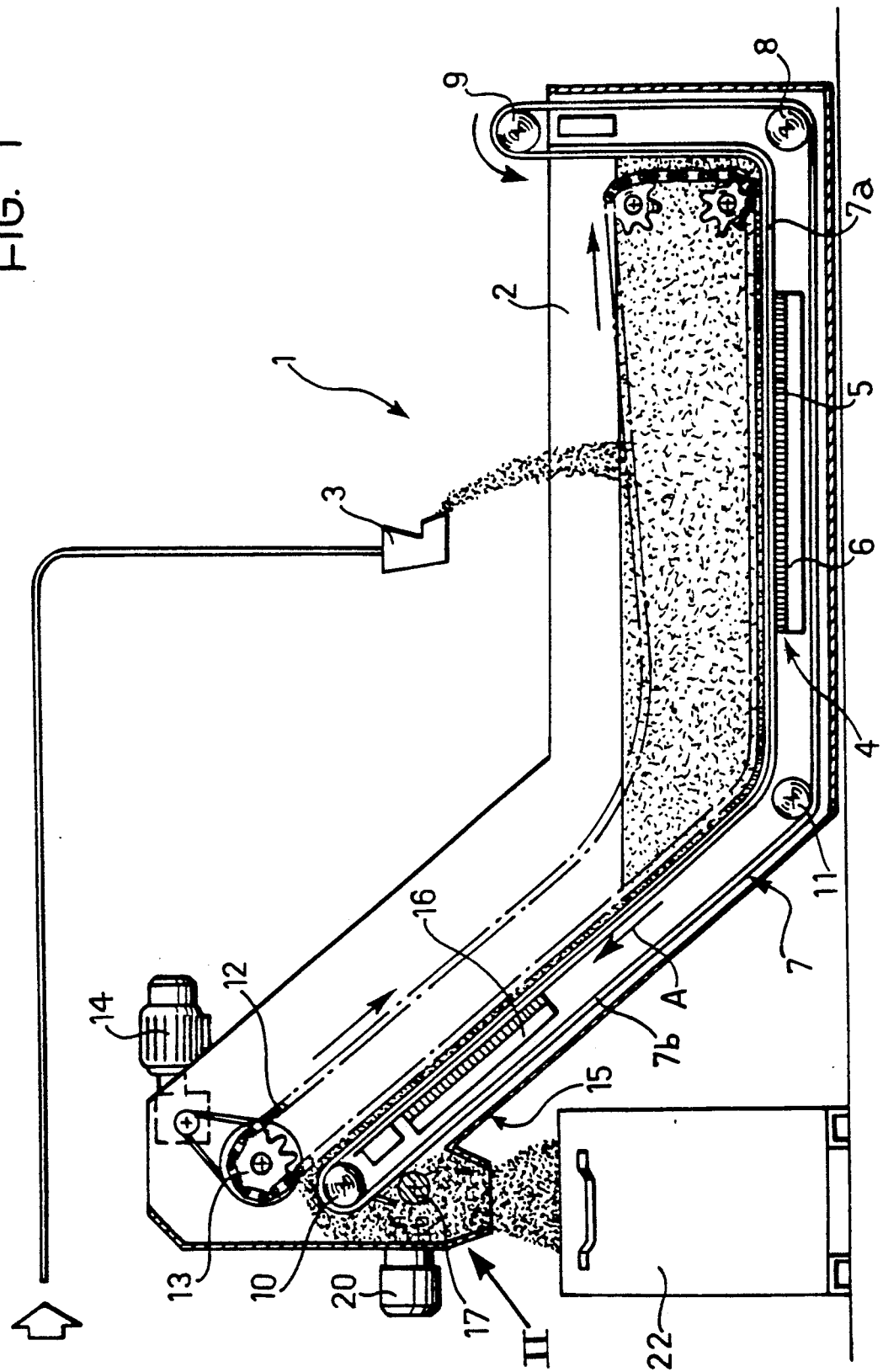
FIG. 1 is a partially-vertically-sectioned schematic view of a self-cleaning vacuum filter according to the invention.

With reference to the drawings, a self-cleaning vacuum filter according to the invention, generally indicated 1, comprises essentially a tank 2 which is intended to be supplied with the liquid to be filtered from a collector 3 and has a filter assembly, generally indicated 4, at its bottom.

In a generally known manner, the filter assembly 4 includes a filter screen 5 defining the top of a vacuum chamber 6 which is connected by a bottom side connector, not shown, to the suction side of an electric pump whose delivery is connected to a circuit for supplying the filtered liquid to the user.

The filter assembly 4 also includes an endless loop of regenerable filter cloth 7 which passes around idle return rollers 8, 9, 10, 11 and defines between them an active outward pass 7a, whose central horizontal portion bears on the screen 5 substantially with lateral sealing, and a return pass 7b. In the embodiment illustrated, the arrangement of the rollers 8-11 is such that the surface (indicated 7c in FIG. 2) of the loop defined by the cloth 7, on which the filtered material is deposited, always faces outwardly of the loop. This is due to the fact that the return pass 7b extends beneath the vacuum chamber 6.

It should be noted that the arrangement could be different, with the return pass 7b extending above the pass 7a.

The filter cloth 7 is movable over the screen 5 of the filter assembly 4 in steps by an entrainment system including a pair of endless chains 12 which pass round respective sprockets, of which that indicated 13 is rotated by an electric motor 14. The entrainment system operated by the chains 12 is similar to that described in the prior European patent application cited above and, for brevity, will therefore not be described in detail.

Figure 2:
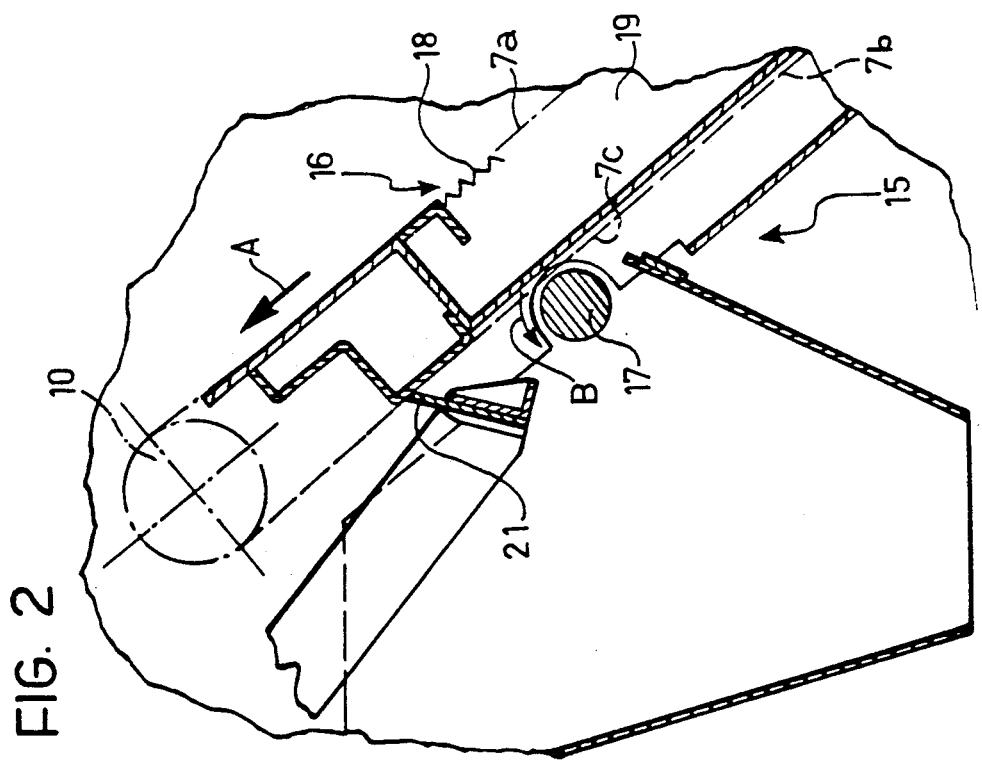
FIG. 2 is a view of the detail indicated by the arrow II in FIG. 1, on an enlarged scale.

The station for the removal of the filtered material from the cloth 7 is generally indicated 15 and, naturally, is downstream of the filter assembly 4 relative to the direction of advance, indicated A, of the cloth. With reference in greater detail to FIG. 2, the removal station 15 is arranged above one end of the tank 2 and includes a drying unit 16 beneath an ascending slope of the pass 7a of the belt 7, the return roller 10 near which a descending slope of the return pass 7b starts, and a rotary removal roller 17.

The drying unit 16 includes, also in a manner known from the prior European patent application mentioned above, a grid 18 on which the ascending slope of the pass 7a of the cloth 7 bears and which defines a vacuum chamber 19 connected to a pneumatic vacuum source, not shown. The drying unit 16 dries the filtered material deposited on the pass 7a of the cloth 7 in order to facilitate its subsequent at least partial removal as a result of the passage of the cloth 7 around the return roller 10.

The removal is completed by the rotary roller 17 which is downstream of the return roller 10 relative to the direction of advance A of the cloth 7 and extends transverse the latter with its cylindrical wall substantially in contact with the surface 7c on which the filtered material is deposited. The cylindrical wall of the roller 17 may be in fact spaced slightly (for example, by a few microns) from the surface 7c.

The removal roller 17 is rotated by an independent electric motor 20 at high speed, normally faster than 2500 revolutions per minute, in a sense B which may or may not correspond to the direction of advance A of the cloth 7. The cylindrical wall of the roller 17 may be smooth, grooved or knurled.

A scraper member 21 with an inclined blade that interacts with the deposition surface 7c of the cloth 7 may also be provided between the return roller 10 and the removal roller 17.

In operation, the lubricating and cooling liquid to be filtered is admitted to the tank 2 from above and is drawn into the vacuum chamber 6 through the screen 5 and the portion of the cloth 7 held thereon by the chains 12. Whilst the filtered liquid is recycled from the chamber 6 to the lubricating and cooling circuits of the associated machine tools, the filtered material is collected on that portion of the cloth 7. As soon as the degree of vacuum in the chamber 6 reaches a predetermined threshold, a signal is generated to enable the geared motor unit 14 to be activated to advance the cloth 7, entrained by the chains 12, by a predetermined distance. A clean portion of the cloth 17 is thus positioned in correspondence with the filter bed 4 whilst the previous portion is moved towards the removal station 15. The filtered material is then dried by the unit 16 and the subsequent advance of the cloth 7 causes most of the material to be removed therefrom as a result of passage of the cloth around the return roller 10. The removal of the filtered material is completed by the action of the roller 17 and by any scraper 21, the high-speed rotation of the roller 17 (normally in synchronism with the advance of the cloth 7) completely removing any remaining particles. This removal takes place by a fluid-dynamic effect of the suction created by the vacuum in the region between the surface 7c of the cloth 7 and the cylindrical wall of the roller 17 which is very close to it. The filtered material removed is then collected in a container 22 beneath the removal station 15.

Figure 3:
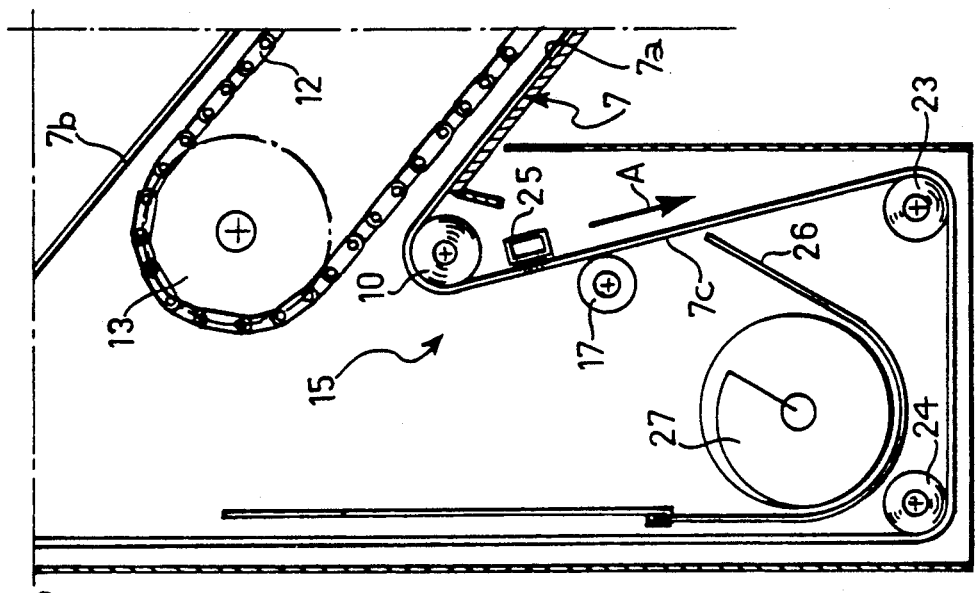
FIG. 3 shows a variant of FIG. 2.

The variant shown in FIG. 3 shows a different way in which the removal roller 17 can be applied to a filter of a different type from that described above, in which the return pass 7b of the filter cloth 7 extends above the active pass 7a. In this variant, two further return rollers 23, 24 are provided downstream of the return roller 10 relative to the direction of advance A of the cloth 7 and they cause the initial portion of the return pass 7b to follow the path shown in the drawing. In this variant, the rotary roller 17 is again disposed downstream of the return roller 10 and a compressed-air supply unit 25 is interposed between the two rollers 10 and 17.

The filtered material removed from the surface 7c of the cloth 7 is collected by a chute 26 and taken away by a screw conveyor 27.

Naturally, the details of construction and forms of embodiment may be varied widely with respect to those described and illustrated, without thereby departing from the scope of the present invention.

What is claimed is:

1. A self-cleaning vacuum filter, particularly but not exclusively for filtering industrial lubricants and coolants, comprising a tank for the liquid to be filtered, a filter means contained within said tank and including a screen and an endless loop of regenerable filter cloth, return rollers around which the filter cloth passes, a vacuum chamber communicating with a bottom of the filter means, suction means connected to the vacuum chamber for withdrawing the filtered liquid therefrom, a station for the removal of the filtered material, the station extending out of the tank and having removal means for removing the filtered material from the filter cloth, and motor-driven entrainment means for moving the filter cloth in steps in a direction over the screen and through said station, wherein the removal means includes a roller extending transversely to the direction of movement of the filter cloth, substantially in contact therewith, said roller having an outer cylindrical surface which is substantially tangential to the filter cloth, and motor driven means for rotating the roller at high speed in a sense which is opposite to the direction of movement of the filter cloth, whereby removal of the filtered material from the filter cloth takes place by a fluid-dynamic effect due to rotation of said roller.

2. A filter according to claim 1, wherein the cylindrical surface of the rotary roller is smooth.

3. A filter according to claim 1, wherein the cylindrical surface of the rotary roller is grooved.

4. A filter according to claim 1, wherein the cylindrical surface of the rotary roller is knurled.

5. A filter according to claim 1, wherein said motor driven means rotates the rotary roller faster than 2,500 revolutions per minute.

6. A filter according to claim 1, wherein the removal means also include a scraper blade arranged upstream of the rotary roller relative to the direction of advance of the filter cloth.

7. A filter according to claim 1, wherein the removal means also include a compressed-air blower unit upstream of the rotary roller relative to the direction of advance of the filter cloth.

* * * * *